United States Patent
Denk et al.

(10) Patent No.: US 9,217,467 B2
(45) Date of Patent: Dec. 22, 2015

(54) METHOD FOR OPERATING A THREE-PHASE INVERTER OF A CONVERTER-FED MAGNETIC BEARING

(75) Inventors: Joachim Denk, Berlin (DE); Hans-Georg Köpken, Erlangen (DE); Dietmar Stoiber, Fürth (DE); Frank Viering, Fürth (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 94 days.

(21) Appl. No.: 14/117,304

(22) PCT Filed: Apr. 12, 2012

(86) PCT No.: PCT/EP2012/056682
§ 371 (c)(1),
(2), (4) Date: Nov. 12, 2013

(87) PCT Pub. No.: WO2012/152522
PCT Pub. Date: Nov. 15, 2012

(65) Prior Publication Data
US 2014/0339940 A1 Nov. 20, 2014

(30) Foreign Application Priority Data
May 12, 2011 (EP) .................................... 11165841

(51) Int. Cl.
*H02K 7/09* (2006.01)
*F16C 32/04* (2006.01)

(52) U.S. Cl.
CPC ......... *F16C 32/0453* (2013.01); *F16C 32/0457* (2013.01); *F16C 2300/02* (2013.01)

(58) Field of Classification Search
CPC .................................................. F16C 32/0453
USPC ......... 310/90.5; 318/800, 801, 808, 430, 432, 318/400.02; 388/800
See application file for complete search history.

(56) References Cited

U.S. PATENT DOCUMENTS

| 6,365,996 B2 * | 4/2002 | Schob .......................... 310/90.5 |
| 2001/0013733 A1 | 8/2001 | Schob |

(Continued)

FOREIGN PATENT DOCUMENTS

| DE | 10019761 A1 | 12/2000 |
| DE | 102007028229 B3 | 9/2008 |

(Continued)

OTHER PUBLICATIONS

Industrialization of AMB systems with standard drive technology; Hartmut Walter, Dr. Joachim Denk, Dietmar, Stolber, Dr. Hans-Georg Köpken PCIC Europe, Jun. 15-17, 2010, Oslo Norwegen; 2010; NO; Jun. 15, 2010.

(Continued)

*Primary Examiner* — Antony M Paul
(74) *Attorney, Agent, or Firm* — Henry M. Feiereisen LLC

(57) ABSTRACT

In a method for operating a three-phase inverter of a converter-fed magnetic bearing, two coils are connected to respective outputs of the three-phase inverter at one end and are connected to each other and to a third output of the three-phase inverter at the other end. A variable control current is injected into the third output. A constant bias current flows between the respective outputs and thus serially through the two coils. The control current is divided among the two respective outputs so as to flow parallel through the two coils. This arrangement significantly reduces the effective current load of the three-phase inverter and significantly increases the slew rate of the control current.

5 Claims, 3 Drawing Sheets

(56) References Cited

U.S. PATENT DOCUMENTS

| | | |
|---|---|---|
| 2007/0216244 A1* | 9/2007 | Edelson ................... 310/90.5 |
| 2009/0302699 A1* | 12/2009 | Denk et al. ................ 310/90.5 |
| 2010/0013332 A1* | 1/2010 | Vollmer ..................... 310/90.5 |
| 2010/0181855 A1 | 7/2010 | Denk |

FOREIGN PATENT DOCUMENTS

| | | | |
|---|---|---|---|
| EP | 0920109 | A2 | 6/1999 |
| EP | 1158648 | A1 | 11/2001 |
| EP | 2131052 | A1 | 12/2009 |
| WO | WO 9707341 | A1 | 2/1997 |

OTHER PUBLICATIONS

Active magnetic bearing systems with standard drive technology for large turbo machines; Hartmut Walter, Dr. Joachim Denk, Dietmar Stoiber PCIC 2010, Sep. 20-22, 2010, San Antonio, TX, USA; US. International Search Report issued by the European Patent Office in International Application PCT/EP2012/056682.

* cited by examiner

US 9,217,467 B2

METHOD FOR OPERATING A THREE-PHASE INVERTER OF A CONVERTER-FED MAGNETIC BEARING

CROSS-REFERENCES TO RELATED APPLICATIONS

This application is the U.S. National Stage of International Application No. PCT/EP2012/056682, filed Apr. 12, 2012, which designated the United States and has been published as International Publication No. WO 2012/152522 and which claims the priority of European Patent Application, Serial No. 11165841.5, filed May 12, 2011, pursuant to 35 U.S.C. 119 (a)-(d).

BACKGROUND OF THE INVENTION

Such a converter-fed magnetic bearing is known from DE 10 2007 028 229 B3. A converter-fed magnetic bearing of this type is shown in more detail in FIG. 1. This FIG. 1 refers to a converter-fed magnetic bearing with 2, a converter with 4, an inverter with 6, an upper magnetic armature with 8, a lower magnetic armature with 10, a coil of the upper magnetic armature 8 with 12, a coil of the lower magnetic armature 10 with 14, a feed unit of the converter 4 with 16 and a feeding network with 18. In this representation the coil 12 of the upper magnetic armature 8 is connected with a first connection 20 to an output W of the inverter 6, wherein a first connection 22 of the coil 14 of the lower magnetic armature 10 is connected to an output V of the inverter 6. The second connections 24 and 26 of the two coils 12 and 14 are connected to one another and to a third output U of the inverter 6. The converter 4, in addition to the inverter 6, also still comprises a feed unit 16, which is connected on the AC voltage side to a feeding network 18. The feed unit 16 is connected on the DC voltage side to DC voltage side connections DC+ and DC− of the inverter 6. The inverter 6 is available on the market as a motor module for a conventional converter device.

An inverter device of this type is normally used to activate a three-phase motor. To ensure that a three-phase motor, in particular a synchronous motor, can be regulated in accordance with standards in respect of rotational speed or torque, this motor module comprises a field-oriented regulator. In other words, this regulator has two regulating channels, namely one channel for a so-called field-oriented current component, which is generally referred to as the d-component of a rotating current vector, and one channel for a so-called torque-forming current component, which is generally referred to as the q-component of a rotating current vector. According to the cited national patent, these two current components, which are to be generated independently of one another, are used for a differential activation of a magnetic bearing. The d-component is in this case assigned the function of a constant current for bias current, wherein the role of the control current of the magnetic bearing, with which the force effect is controlled, is incumbent on the q-component.

A mode of operation of the converter-fed magnetic bearing 2 according to FIG. 1 is known from this DE 10 2007 028 229 B3, which is explained in more detail with the aid of FIGS. 2 to 4.

According to this mode of operation, a transformation angle (rotor position angle of a synchronous motor) of the field-oriented regulation of the inverter 6 is frozen such that the state arises for the inverter 6 as if the magnetic axis of a driven motor permanently and invariably points in a specific direction of the stator, for instance in the direction of the phase at output U. A stator-oriented right-angled α/β system is transformed into a rotor-oriented d/q system by means of this transformation angle (rotor position angle), which rotates with a rotor circuit frequency. This rotor position angle is also required again for the back transformation. This transformation angle (rotor position angle) changes during a rotation of the rotor, as a result of which the variable rotor position angle is also referred to as a rotary field angle.

With the mode of operation of the inverter 6 as a feed unit for a magnetic bearing, this transformation angle is frozen such that the flux-forming axis permanently and invariably points in the direction of the phase of the output U of the three-phase inverter. In other words, the transformation angle is constantly predetermined at zero degrees.

In this determination of the transformation angle, the d-current component $i_d$ then flows, in equal parts, into the phase conductor at the outputs V and W. The phase current $i_u$ in the phase at the output U of the three-phase inverter (FIG. 2) is thus twice as large as the current $i_d$. The arrow directions in FIG. 2 indicate the direction in which a current is to be evaluated as positive. Conversely the q-current component $i_q$ flows out of the phase at output W directly into the phase at output V of the three-phase inverter, wherein the phase at the output U of this three-phase inverter is not affected (FIG. 3). In FIG. 4, the addition of the d- and q-current components $i_d$ and $i_q$ is shown at full scale of the converter-fed magnetic bearing.

The effective current is crucial to the thermal load of the inverter 6. The effective current can be understood to be the direct current which an equivalent heat output would generate in an imaginary 1 ohm resistor. Since the inverter 6 outputs three phase currents, an associated replacement direct current acts in three resistors with 1 Ohm in each instance. During operation with $i_d$=10 A from the output U of the inverter 6, a current $i_u$=−20 A and into the outputs V and W of the inverter 6 a current $i_v$=10 A and $i_w$=10 A respectively. An effective current of 14.14 $A_{eff}$ is produced.

With magnetic bearings, the full scale level is generally defined such that at full scale the current linkage (number of ampere turns) for instance in the coil 12 of the upper magnetic armature of the magnetic bearing 2 just about disappears, while it doubles in the coil 14 of the lower magnetic armature of this magnetic bearing compared with a basic current linkage (FIG. 4). At full scale level of the magnetic bearing, the effective current with the already specified current values has a value of 16.33 $A_{eff}$. In other words, the effective value only changes to a minimal degree between the states bias current and full scale (FIG. 11). According to this known mode of operation, the bias current (d-current component) according to the known operating method (DE 10 2007 028 B3) is injected into the phase at output U of the inverter 6.

According to the effective current load of the inverter 6, the velocity of the change in current is an important feature of a magnetic bearing activation. The quicker the magnetic bearing can change the control current and thus the force, the better it can respond to a dynamic force requirement, such as for instance imbalance or a sudden external load affecting it.

The velocity of the change in current is proportional to the voltage difference which can be applied at the two connections 22 and 20 of the two coils 14 and 12 of the converter-fed magnetic bearing 2. As a maximum voltage difference, the inverter 6 can apply the intermediate circuit voltage present at its DC voltage side connections DC+ and DC− in any manner to its outputs U, V and W. The intermediate circuit voltage $U_{ZK}$ is offered by an intermediate circuit capacitor 28 of the converter 4, which is therefore also referred to as voltage intermediate circuit converter. An intermediate circuit voltage $U_{ZK}$ is a rectified network voltage which is generated by means of the feed unit 16. With the magnetic bearing controller according to DE 10 2007 028 229 B3, the control current ($i_q$-current component of the inverter) flows between the outputs V and W of the three-phase inverter 6. The quickest change in this control current is achieved if the inverter 6 is activated such that its output W is connected to the reference potential of the voltage intermediate circuit and its output V is connected to a positive potential of the voltage intermediate circuit of the converter 4. According to this controller, the intermediate circuit voltage $U_{ZK}$ is applied to the outputs V and W of the three-phase inverter 6, and is thus applied to the series circuit of the two coils 12 and 14 of the converter-fed magnetic bearing 2 (FIG. 5). If it is assumed that the two coils 12 and 14 of this magnetic bearing 2 each have an inductance L, the rate of current rise is produced in accordance with the following equation:

$$\frac{\Delta I}{\Delta t} = \frac{U_{ZK}}{2 \cdot L}$$

The two inductances L of the two electrically series-connected coils 12 and 14 of the magnetic bearing are opposed by the change in current which is driven by the voltage $U_{ZK}$.

SUMMARY OF THE INVENTION

The object now underlying the invention is to further develop the operating method of the converter-fed magnetic bearing such that the effective current is substantially lowered and as high a rate of current rise as possible is achieved.

This object is achieved in accordance with the invention with the method for operating a three-phase inverter of a converter-fed magnetic bearing, wherein two coils of the magnetic bearing are connected by a first connection to a respective output of the three-phase inverter at one end and are connected by a second connection to each other and to a third output of the three-phase inverter at the other end.

The inventive method for operating a three-phase inverter of a converter-fed magnetic bearing is characterized in that a variable control current of the magnetic bearing is injected into an output and a constant bias current of the magnetic bearing is injected into two further outputs as a difference in the currents. On account of this mode of operation of the three-phase inverter, the current direction of the d-current components differs from one another in the phases of the outputs V and W of the inverter. At the same time, the q-current component is injected into the phase of the output U of the inverter, from which this is divided, in equal parts, between the phases of the outputs V and W of the three-phase inverter. In these two phases of the outputs V and W of the three-phase inverter, the q-current component herewith appears with the same prefix.

This current distribution causes the d- and q-current components to be added in the phase of the output V of the three-phase inverter, whereas they cancel each other out in the phase of the output W of the three-phase inverter. Since, compared with the known current control, the direction of the d-current component in the phase of the output W of the three-phase inverter is inverted by the inventive current distribution, and a d-current component no longer flows in the phase of the output U of the three-phase inverter, the effective current and thus the effective current load of the three-phase inverter reduces significantly. By feeding the q-current component in the phase of the output U of the inverter, this divides into the two other phases of the outputs V and W of the three-phase inverter in equal parts. In cooperation with the d-current components, the current linkage in the phase of the output V of the three phase inverter is amplified, whereas this is reduced in the phase of the output W of the three-phase inverter. At full scale of the magnetic bearing, there is no difference compared with the known current distribution of a three-phase inverter of a converter-fed magnetic bearing.

There is thus no change in a desired force effect of the converter-fed magnetic bearing, but a reduction in the load on the inverter of this converter, which feeds the magnetic bearing, is achieved in the major part of the operating range.

The inventive assignment of the d-current (bias current of the magnetic bearing) and of the q-current (control current of the magnetic bearing) freezes the transformation angle of the field-oriented regulation of the inverter of the converter-fed magnetic bearing, such that the state arises for this inverter as if the magnetic axis permanently and invariably points in a specific direction of the stator-oriented coordinate system. Compared with the known current assignment, this magnetic axis is rotated about 90°. Compared with the known method for operating a three-phase inverter of a converter-fed magnetic bearing, the transformation angle is now predetermined constantly with 90° instead of constantly with 0°.

BRIEF DESCRIPTION OF THE DRAWING

For further explanation of the invention, reference is made to the drawing, in which the inventive method for operating a three-phase inverter of a converter-fed magnetic bearing is explained schematically.

FIG. 7 shows the distribution of the q-current component, which is produced according to the inventive method, wherein

DETAILED DESCRIPTION OF PREFERRED EMBODIMENTS

Figure 1:
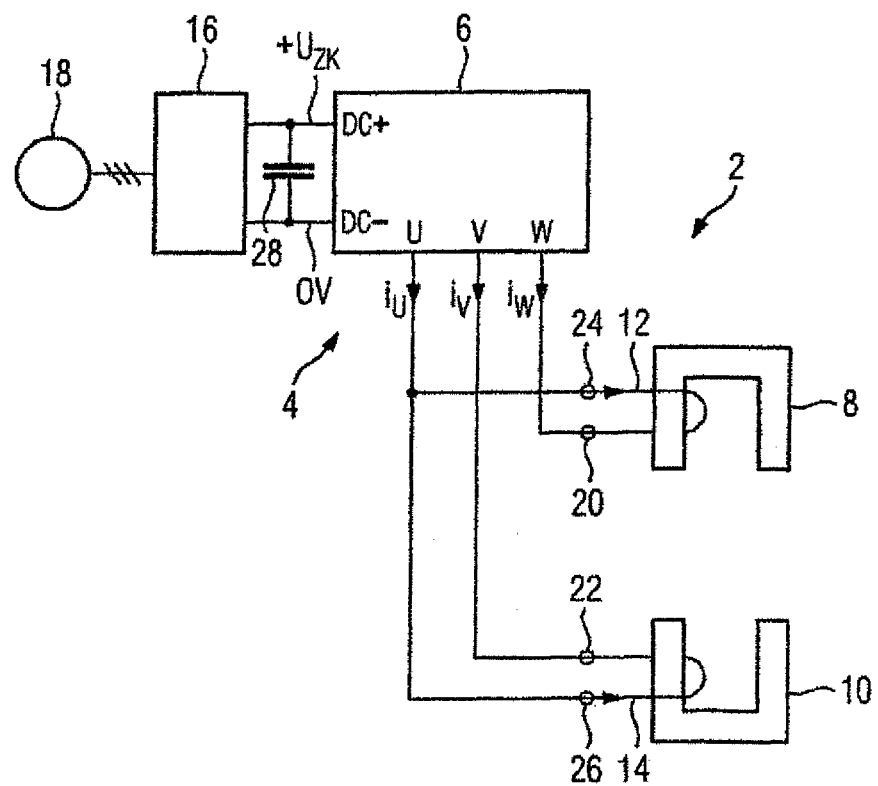
FIG. 1 shows an equivalent circuit diagram of a converter-fed magnetic bearing according to the prior art.
Figure 2:
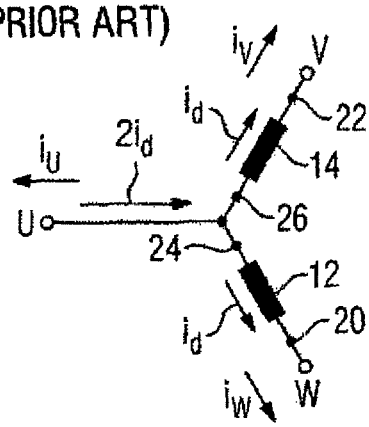
FIG. 2 shows the distribution of a d-current component to two coils of the magnetic bearing according to FIG. 1.
Figure 3:
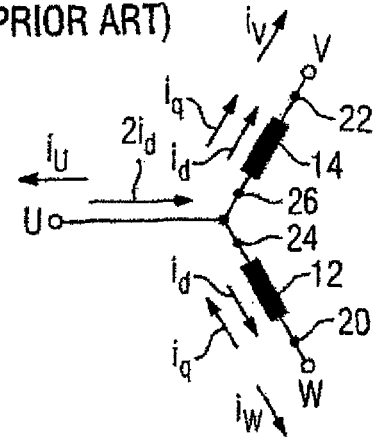
FIG. 3 shows in addition the distribution of a q-current component relative to the d-current component distribution according to FIG. 2.
Figure 4:
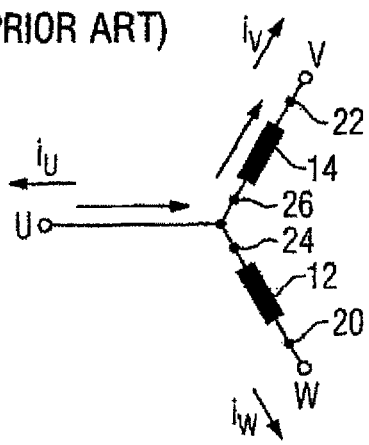
FIG. 4 shows a resulting current component distribution, which results from the d and q-current component distributions of FIG. 3.
Figure 5:
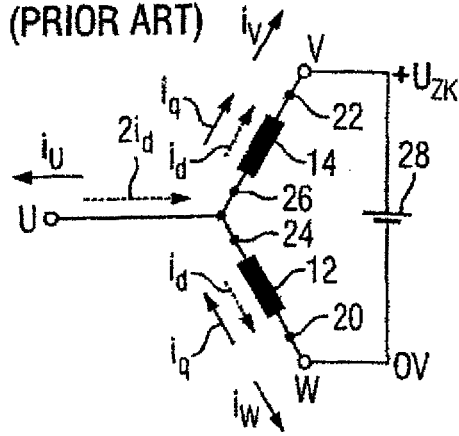
FIG. 5 shows a connection of the intermediate circuit of the converter of the magnetic bearing for a maximum rate of current increase of the control current.
Figure 6:
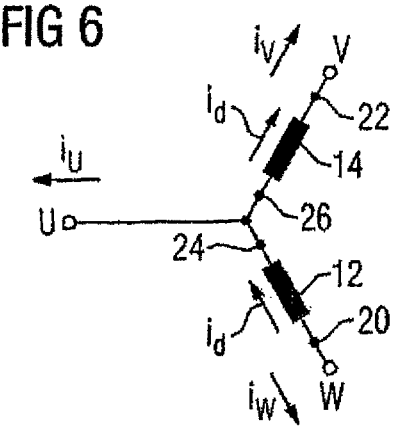
FIG. 6 shows the distribution of the d-current component to two coils of the magnetic bearing according to FIG. 1 according to the inventive method.
Figure 7:
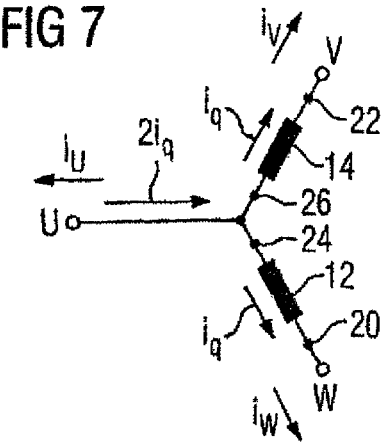
Figure 8:
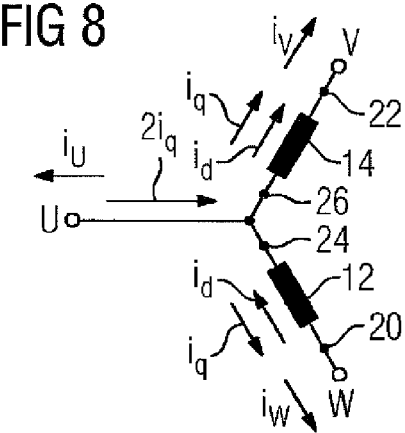
FIG. 8 shows the distribution of the d- and q-current components of FIGS. 6 and 7 together.
Figure 9:
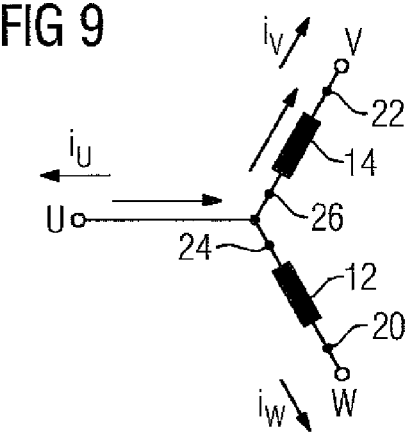
FIG. 9 shows a resulting current component distribution, which results from the d- and q-current component distributions of FIGS. 6 and 7 and/or FIG. 8.
Figure 11:
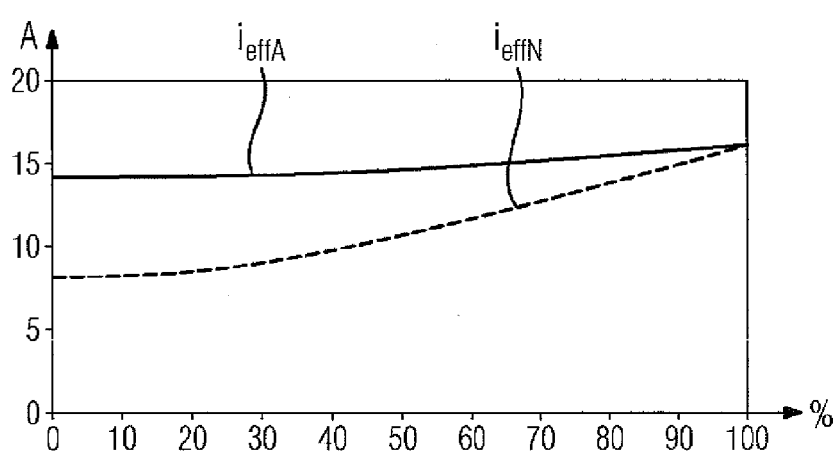
FIG. 11 shows, in a diagram, a curve of an effective current across the phase control factor, which develop with the known and the inventive assignment of the d- and q-current components in the coils of a converter-fed magnetic bearing according to FIG. 1.

By inventively prespecifying the transformation angle of a field-oriented regulation of the three-phase inverter 6 of the converter 4, which feeds a magnetic bearing 2, at 90°, the distribution of the d-current component (bias current of the magnetic bearing) is produced according to the representation in FIG. 6. The inventive transformation angle injects the d-current component $i_d$ as a constant bias current into the phases of the outputs V and W of the three-phase inverter 6. As a result, the current directions in the phases of the outputs V and W of the three-phase inverter 6 of the d-current component $i_d$ are opposed to one another. The inventive specification of the transformation angle of the field-oriented regulation of the three-phase inverter 6 at 90° at the same time injects the q-current component $i_q$ as a control current into the phase of the output U of the three-phase inverter 6, from which these q-current components $i_q$ are distributed, in equal parts, onto the two phases of the outputs V and W of the three-phase inverter (FIG. 7). In FIG. 8, the distributions of the d- and q-current components $i_d$ and $i_q$ are shown together, wherein a resulting current distribution at full scale is shown in FIG. 9. A comparison of FIGS. 4 and 9 shows that when the converter-fed magnetic bearing 2 is at full scale, the same difference in current distribution is produced between the two coils 12 and 14 of the magnetic bearing 2. In other words, at full scale, there is no difference in the effective current load of the three-phase inverter 6. This is also shown in the diagram in FIG. 11, in which the effective current $i_{effA}$ is shown according to the known method and the effective current $i_{effN}$ according to the inventive method across the phase control factor of the magnetic bearing 2. If the phase control factor is zero, the effective current load of the three-phase inverter 6 is approximately halved.

Figure 10:
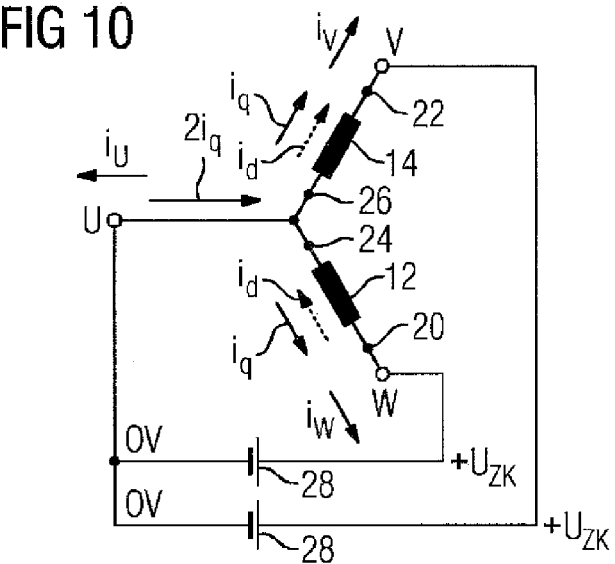
FIG. 10 shows an activation of the intermediate circuit of the converter of the magnetic bearing for a maximum rate of current increase of the control current as a result of the inventive method.

In respect of the control current ($i_q$-current component of the field-oriented regulation of the three-phase inverter 6) of the magnetic bearing 2, the two coils 12 and 14 of the converter-fed magnetic bearing 2 are parallel to the phase of the output U of the three-phase inverter 6. In order to achieve the quickest change in the torque-forming current component $i_q$ (control current of the magnetic bearing), the output U of the inverter 6 is applied to the reference potential of the converter 4 and the intermediate circuit voltage $U_{ZK}$ is interconnected at the two outputs V and W of the three-phase inverter 6 (FIG. 10). The velocity at which the current changes is now produced since the intermediate circuit voltage $U_{ZK}$ is no longer switched to the series circuit of the two coils 12 and 14 of the magnetic bearing 2, but is instead applied to each of the two coils 12 and 14 of the converter-fed magnetic bearing 2, according to the following equation:

$$\frac{\Delta I}{\Delta t} = \frac{U_{ZK}}{1 \cdot L}$$

An inductance L thus only opposes the current change in the inventive method for operating a three-phase inverter 6 of a converter-fed magnetic bearing 2. Compared with the known method, there is thus a doubling in the velocity at which the current increases in inventive operation of the three-phase inverter 6 of a converter-fed magnetic bearing 2.

With the inventive definition of the transformation angle of the field-oriented regulation of the three-phase inverter 6 to 90° constant, a small inductance is effective in the direction of the q-current component $i_q$ (control current of the magnetic bearing), whereas a large inductance is effective in the direction of the d-current component $i_d$ (bias current of the magnetic bearing). In other words, the coil configuration of the converter-fed magnetic bearing 2 is a non-symmetrical rotary current winding. This results in the inductance, on which the converter 4 feeding the inverter 6 of the magnetic bearing 2 operates, being independent of the rotary field angle. The non-symmetry has unfavorable effects on the operating behavior. To solve this problem, according to the prior art for the d- and q-current components, different current intensities are predetermined for the current regulation channels. Contrary to the prior art, the proportional amplification of the current regulating channel of the d-current component $i_d$ is set to be larger than that of the current regulation channel of the q-current component $i_q$. A ratio between 2:1 to 4:1 can be selected as the preferred ratio between these two proportional amplifications.

The inventive distribution of the d- and q-current components, which is effected by predetermining a transformation angle (rotor position angle of a synchronous motor) of the field-oriented regulation of the three-phase inverter 6 to 90° constant compared with 0° constant according to the known method is achieved in that the effective current load of the inverter 6 of the converter 4 feeding the magnetic bearing 2 is considerably more favorable. With a modulation of 0%, the load of the inverter is almost halved. Furthermore, it is achieved that the rate increase in the current of the control current of the converter-fed magnetic bearing 2 is doubled, as a result of which the converter-fed magnetic bearing 2, which is operated with the inventive method, can essentially respond more dynamically to changes in position.

The invention claimed is:

1. A method for operating a three-phase inverter of a converter-fed magnetic bearing, the magnetic bearing comprising a first coil located at an upper magnetic armature and having a first terminal connected to a first output of the inverter and a second coil located at a lower magnetic armature and having a first terminal connected to a second output of the inverter, wherein second terminals of the first and second coils are connected to a third output of the inverter, the method comprising:
    injecting a variable control current into the third output of the inverter, with the variable control current being divided between the first and second coils and the first and second outputs of the inverter connected thereto, and
    injecting a constant bias current into the first output and the second output of the inverter and the coils connected in series between the first output and the second output, thereby causing corresponding phase currents to be generated in the first and second coils and the first and second outputs connected to the first and second coils from the difference between the variable control current and the constant bias current, while taking into account polarities of the variable control current and the constant bias current.

2. The method of claim 1, further comprising freezing a transformation angle of a field-oriented control of the inverter of the converter-fed magnetic bearing such that a force-forming axis permanently and invariably points in a direction of a phase of the third output of the inverter.

3. The method of claim 2, wherein the variable control current is injected into the respective outputs of the inverter as a q-current component and the constant bias current is injected into the respective outputs of the inverter as a d-current component of the field-oriented control.

4. The method of claim 3, wherein for achieving a fastest change in the q-current component forming a torque, a reference potential of a converter is applied to the third output of the inverter and an intermediate circuit voltage of the converter is applied to the first and second outputs of the inverter.

5. The method of claim 3, further comprising
selecting a ratio of proportional amplifications between a current control channel of the d-current component and a current control channel of the q-current component of between 2:1 and 4:1 so as to prevent asymmetry when the first and second coils of the magnetic bearing are connected to the inverter.

* * * * *